United States Patent
Hirao et al.

(10) Patent No.: US 9,922,767 B2
(45) Date of Patent: Mar. 20, 2018

(54) CERAMIC ELECTRONIC COMPONENT AND MANUFACTURING METHOD THEREFOR

(71) Applicant: Murata Manufacturing Co., Ltd., Nagaokakyo-shi, Kyoto-fu (JP)

(72) Inventors: Takahiro Hirao, Nagaokakyo (JP); Kenji Ueno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 68 days.

(21) Appl. No.: 14/858,059

(22) Filed: Sep. 18, 2015

(65) Prior Publication Data
US 2016/0093443 A1    Mar. 31, 2016

(30) Foreign Application Priority Data

Sep. 30, 2014 (JP) ................................ 2014-201669

(51) Int. Cl.
| | |
|---|---|
| *H01G 4/30* | (2006.01) |
| *H01G 4/012* | (2006.01) |
| *H01G 4/008* | (2006.01) |
| *H01G 4/232* | (2006.01) |
| *H01G 4/12* | (2006.01) |

(52) U.S. Cl.
CPC .............. *H01G 4/30* (2013.01); *H01G 4/0085* (2013.01); *H01G 4/012* (2013.01); *H01G 4/232* (2013.01); *H01G 4/1227* (2013.01)

(58) Field of Classification Search
CPC ........... H01G 4/30; H01G 4/228; H01G 4/38; H01G 4/05
See application file for complete search history.

(56) References Cited

U.S. PATENT DOCUMENTS

| | | | | |
|---|---|---|---|---|
| 5,995,453 A | * | 11/1999 | Hirata | .................. B06B 1/0622 |
| | | | | 310/357 |
| 8,233,264 B2 | * | 7/2012 | Cho | ....................... H01G 4/005 |
| | | | | 361/303 |
| 2007/0074806 A1 | | 4/2007 | Kojima et al. | |

(Continued)

FOREIGN PATENT DOCUMENTS

| | | |
|---|---|---|
| JP | 52-136354 A | 11/1977 |
| JP | 59-090916 A | 5/1984 |
| JP | 08-115843 A | 5/1996 |

(Continued)

OTHER PUBLICATIONS

Official Communication issued in corresponding Japanese Patent Application No. 2014-201669, dated Mar. 14, 2017.

*Primary Examiner* — Nguyen Ha
(74) *Attorney, Agent, or Firm* — Keating & Bennett, LLP

(57) ABSTRACT

A ceramic electronic component includes an electronic component ceramic main body and internal electrodes disposed within the electronic component main body. The internal electrodes include through holes passing through the internal electrodes in the thickness direction. Ceramic columns are disposed in the through holes and connect the ceramic on one side of the internal electrodes and the ceramic on the other side thereof. An area ratio of the ceramic columns to ends of the internal electrodes located within the electronic component main body is greater than an area ratio of ceramic columns to central portions of the internal electrodes.

18 Claims, 7 Drawing Sheets

(56) References Cited

U.S. PATENT DOCUMENTS

2015/0043127 A1  2/2015  Rinner
2015/0124371 A1* 5/2015  Park .................. H01G 4/012
                                              361/301.4

FOREIGN PATENT DOCUMENTS

| JP | 2000-277367 A | 10/2000 |
| JP | 2002-198249 A | 7/2002 |
| JP | 2003-77761 A | 3/2003 |
| JP | 2007-27665 A | 2/2007 |
| JP | 2007-103453 A | 4/2007 |
| WO | 2013/037559 A1 | 3/2013 |

* cited by examiner

CERAMIC ELECTRONIC COMPONENT AND MANUFACTURING METHOD THEREFOR

BACKGROUND OF THE INVENTION

1. Field of the Invention

The present invention relates to a ceramic electronic component and a method for manufacturing the component.

2. Description of the Related Art

Conventionally, large numbers of ceramic electronic components such as multilayer ceramic capacitors have been mounted on various electronic devices. Japanese Patent Application Laid-Open No. 2003-77761 discloses a multilayer ceramic capacitor that has internal electrode layers and dielectric ceramic layers alternately stacked. The multilayer ceramic capacitor disclosed in Japanese Patent Application Laid-Open No. 2003-77761 is provided with a ceramic as a common material, which penetrates the internal electrode layers. This ceramic as a common material suppresses delamination between the internal electrode layers and the dielectric ceramic layers.

There is an unrealized and unmet demand for ceramic electronic components for use under severe environments, such as ceramic electronic components mounted on, for example, in-car electronic devices to suppress delamination of internal electrodes more effectively.

SUMMARY OF THE INVENTION

Preferred embodiments of the present invention provide ceramic electronic components that are unlikely to cause delamination of an internal electrode.

A ceramic electronic component according to a preferred embodiment of the present invention includes an electronic component main body and an internal electrode. The electronic component main body is composed of a ceramic. The internal electrode is disposed in the electronic component main body. The internal electrode includes a through hole passing through the internal electrode in the thickness direction thereof. A ceramic electronic component according to a preferred embodiment of the present invention further includes a ceramic column. The ceramic column is disposed in the through hole. The ceramic column connects the ceramic on one side of the internal electrode and the ceramic on the other side thereof. An area ratio of the ceramic column to ends of the internal electrode located within the electronic component main body is greater than an area ratio of the ceramic column to a central portion of the internal electrode.

In a ceramic electronic component according to a preferred embodiment of the present invention, the electronic component main body may include first and second principal surfaces that extend in a first direction, and in a second direction perpendicular or substantially perpendicular to the first direction; first and second side surfaces that extend in a third direction perpendicular or substantially perpendicular to each of the first and second directions, and in the first direction; and third and fourth side surfaces that extend in the second direction and in the third direction. The internal electrode is exposed at the first side surface, while there is no need to expose the electrode at each of the second to fourth side surfaces. In that case, the area ratio of the ceramic column to an end of the internal electrode closer to the second side surface in the first direction is preferably greater than the area ratio of the ceramic column to a central portion of the internal electrode.

In a ceramic electronic component according to a preferred embodiment of the present invention, the electronic component main body may include first and second principal surfaces that extend in a first direction, and in a second direction perpendicular or substantially perpendicular to the first direction; first and second side surfaces that extend in a third direction perpendicular or substantially perpendicular to each of the first and second directions, and in the first direction; and third and fourth side surfaces that extend in the second direction and in the third direction. The internal electrode is exposed at the first side surface, while there is no need expose the electrode at each of the second to fourth side surfaces. In that case, the area ratio of the ceramic column to at least one end of the internal electrode in the second direction is preferably greater than the area ratio of the ceramic column to a central portion of the internal electrode.

In a ceramic electronic component according to a preferred embodiment of the present invention, the area ratio of the ceramic column to the end of the internal electrode closer to the second side surface in the first direction is preferably greater than the area ratio of the ceramic column to at least one end of the internal electrode in the second direction.

In a ceramic electronic component according to a preferred embodiment of the present invention, the internal electrode is not exposed at any of the first to fourth side surfaces, but is rectangular or substantially rectangular as viewed from the third direction, and the area ratio of the ceramic column to both ends along short sides of the internal electrode is preferably greater than the area ratio of the ceramic column to both ends along long sides of the internal electrode.

In a ceramic electronic component according to a preferred embodiment of the present invention, the cross-section area of the ceramic column is preferably about seventy times or more as large as the square of the thickness of the internal electrode, for example.

In a ceramic electronic component according to a preferred embodiment of the present invention, the cross-section area of the ceramic column is preferably about 70 µm² or more, for example.

In a ceramic electronic component according to a preferred embodiment of the present invention, the ceramic column preferably includes the same ceramic material as the electronic component main body.

A ceramic electronic component according to a preferred embodiment of the present invention may include a plurality of internal electrodes. In that case, among the plurality of internal electrodes, a ceramic column provided on one of adjacent internal electrodes may mutually differ in location from a ceramic column provided on the other of adjacent internal electrodes.

A first method for manufacturing a ceramic electronic component according to a preferred embodiment of the present invention relates to a method for manufacturing the above-mentioned ceramic electronic component according to a preferred embodiment of the present invention. In the first method for manufacturing a ceramic electronic component according to a preferred embodiment of the present invention, a ceramic green sheet is prepared to form an electronic component main body. A conductive paste layer with through holes to form internal electrodes is formed over the ceramic green sheet. The through holes are filled with a ceramic paste to form ceramic columns.

A second method for manufacturing a ceramic electronic component according to a preferred embodiment of the present invention relates to a method for manufacturing the above-mentioned ceramic electronic component according to a preferred embodiment of the present invention. In the second method for manufacturing a ceramic electronic component according to a preferred embodiment of the present invention, a ceramic green sheet is prepared to form an electronic component main body. Ceramic columns are formed on the ceramic green sheet. A conductive paste layer to form internal electrodes is formed over the ceramic green sheet, including regions provided with the ceramic columns, such that ends of the ceramic columns are exposed.

According to various preferred embodiments of the present invention, ceramic electronic components that are unlikely to cause delamination of an internal electrode are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
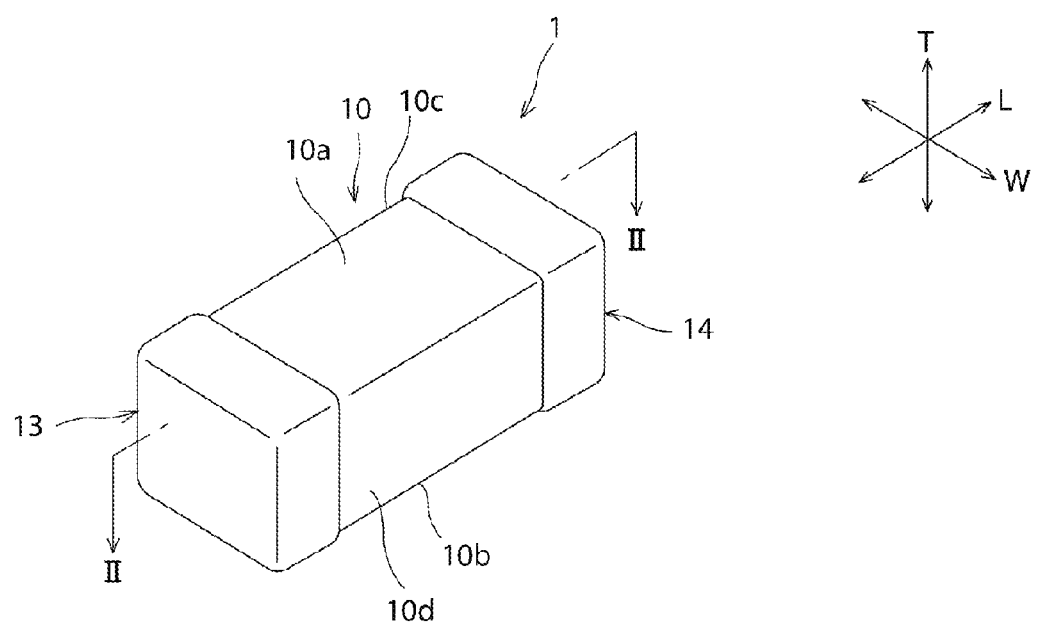
FIG. 1 is a schematic perspective view of a ceramic electronic component according to a preferred embodiment of the present invention.

Examples of preferred embodiments for carrying out the present invention will be described below. However, the following preferred embodiments are considered simply by way of example. The present invention is not limited to the following preferred embodiments in any way.

In addition, in the respective drawings referenced in the preferred embodiments, etc., members that have substantially the same function shall be denoted by the same reference numeral. In addition, the drawings referenced in the following description of preferred embodiments, etc. are schematically made. The dimensional ratios, etc. of the objects drawn in the drawings may differ from the dimensional ratios, etc, of real objects. The dimensional ratios, etc. of the objects may also differ between the drawings. The dimensional ratios, etc. of specific objects should be determined in view of the following description.

Figure 2:
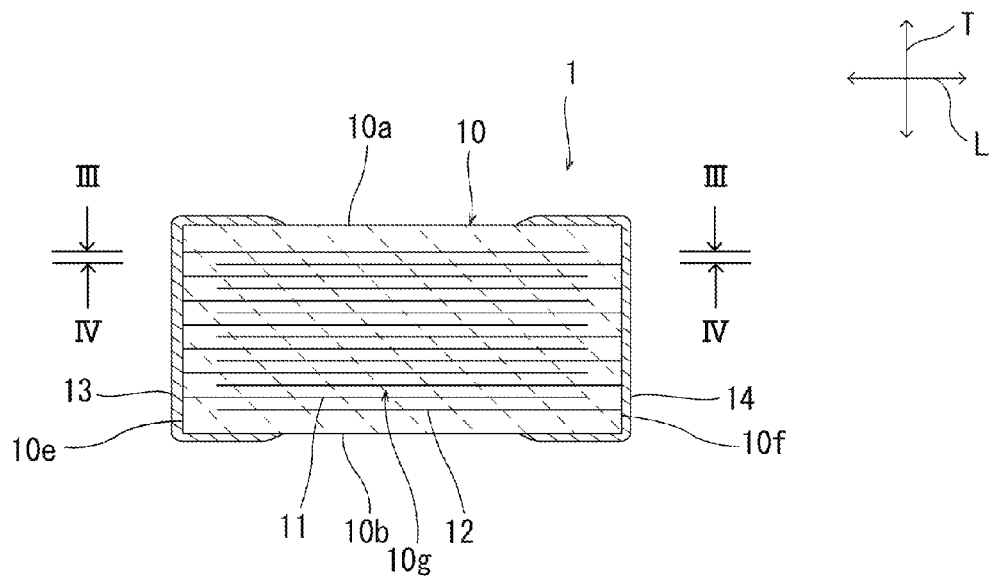
FIG. 2 is a schematic cross-sectional view of a portion cut out along the line II-II in FIG. 1.

FIG. 1 is a schematic perspective view of a ceramic electronic component according to the present preferred embodiment. FIG. 2 is a schematic cross-sectional view of a portion cut out along the line II-II in FIG. 1.

The ceramic electronic component 1 shown in FIGS. 1 and 2 may be a ceramic capacitor, a piezoelectric component, a thermistor, an inductor, or the like.

The ceramic electronic component 1 includes a cuboidal electronic component main body 10. The electronic component main body 10 includes first and second principal surfaces 10a, 10b, side surfaces 10c, 10d, and side surfaces 10e, 10f (see FIG. 2). The first and second principal surfaces 10a, 10b extend in a length direction L and a width direction W. The side surfaces 10c, 10d extend in a thickness direction T and the length direction L. The side surfaces 10e, 10f extend in the thickness direction T and the width direction W. The length direction L, the width direction W, and the thickness direction T are perpendicular or substantially perpendicular to each other.

It is to be noted that the term "cuboidal" is considered to encompass cuboids with corners and ridges rounded in preferred embodiments of the present invention. More specifically, "cuboidal" members mean general members with first and second principal surfaces and four side surfaces. In addition, the principal surfaces and the side surfaces may partially or entirely have asperity or the like.

The dimensions of the electronic component main body 10 are not particularly limited. For example, the electronic component main body 10 is preferably approximately 1.7 mm to 2.2 mm in thickness dimension, preferably approximately 4.5 mm to 6.3 mm in length dimension, and preferably approximately 4.5 mm to 6.3 mm in width dimension.

The electronic component main body 10 is composed of an appropriate ceramic depending on the function of the ceramic electronic component 1. Specifically, when the ceramic electronic component 1 is a capacitor, the electronic component main body 10 can be formed from a dielectric ceramic. Specific examples of the dielectric ceramic include, for example, $BaTiO_3$, $CaTiO_3$, $SrTiO_3$, and $CaZrO_3$. Depending on characteristics required for the ceramic electronic component 1, accessory constituents such as, for example, Mn compounds, Mg compounds, Si compounds, Fe compounds, Cr compounds, Co compounds, Ni compounds, and rare-earth compounds may be added appropriately to the electronic component main body 10.

When the ceramic electronic component 1 is a piezoelectric component, the electronic component main body can be formed from a piezoelectric ceramic. Specific examples of the piezoelectric ceramic include, for example, PZT (lead zirconate titanate) based ceramics.

When the ceramic electronic component 1 is, for example, a thermistor, the electronic component main body can be formed from a semiconductor ceramic. Specific examples of the semiconductor ceramic include, for example, spinel-based ceramics.

When the ceramic electronic component 1 is, for example, an inductor, the electronic component main body can be formed from a magnetic ceramic. Specific examples of the magnetic ceramic include, for example, ferrite ceramics.

As shown in FIG. 2, the electronic component main body 10 includes internal electrodes provided therein. Specifically, the electronic component main body 10 includes a plurality of first internal electrodes 11 and a plurality of second internal electrodes 12 provided therein.

The first internal electrodes 11 preferably are rectangular or substantially rectangular. The first internal electrodes 11 are parallel or substantially parallel with the first and second principal surfaces 10a, 10b. More specifically, the first internal electrodes 11 are provided in the length direction L and the width direction W. The first internal electrodes 11 are exposed at the side surface 10e, but not exposed at the first and second principal surfaces 10a, 10b or the side surfaces 10c, 10d, 10f.

The second internal electrodes 12 preferably are rectangular or substantially rectangular. The second internal electrodes 12 are parallel or substantially parallel with the first and second principal surfaces 10a, 10b. More specifically, the second internal electrodes 12 are provided in the length direction L and the width direction W. Therefore, the second internal electrodes 12 and the first internal electrodes 11 are parallel or substantially parallel to each other. The second internal electrodes 12 are exposed at the side surface 10f, but not exposed at the first and second principal surfaces 10a, 10b or the side surfaces 10c, 10d, 10e.

The first and second internal electrodes 11, 12 are alternately provided in the thickness direction T. The first internal electrode 11 and second internal electrode 12 adjacent to each other in the thickness direction T are opposed with a ceramic portion 10g interposed therebetween. The ceramic portion 10g can be, for example, on the order of about 23 μm to about 29 μm in thickness.

The first and second internal electrodes 11, 12 can be composed of an appropriate conductive material. The first and second internal electrodes 11, 12 can be composed of, for example, a metal selected from the group consisting of Ni, Cu, Ag, Pd, and Au, or an alloy containing one or more metals selected from the group consisting of Ni, Cu, Ag, Pd, and Au (for example, an Ag—Pd alloy).

The first and second internal electrodes 11, 12 are preferably, for example, on the order of about 0.9 μm to about 1.0 μm in thickness.

As shown in FIGS. 1 and 2, the ceramic electronic component 1 includes first and second external electrodes 13, 14. The first external electrode 13 is electrically connected to the first internal electrodes 11 at the side surface 10e. On the other hand, the second external electrode 14 is electrically connected to the second internal electrodes 12 at the side surface 10f. The first and second external electrodes 13, 14 can be composed of, for example, Cu, Ni, Ag, Pd, Sn, an Ag—Pd alloy, or the like. The first and second external electrodes 13, 14 may be each composed of a laminated body of multiple conductive layers.

Figure 3:
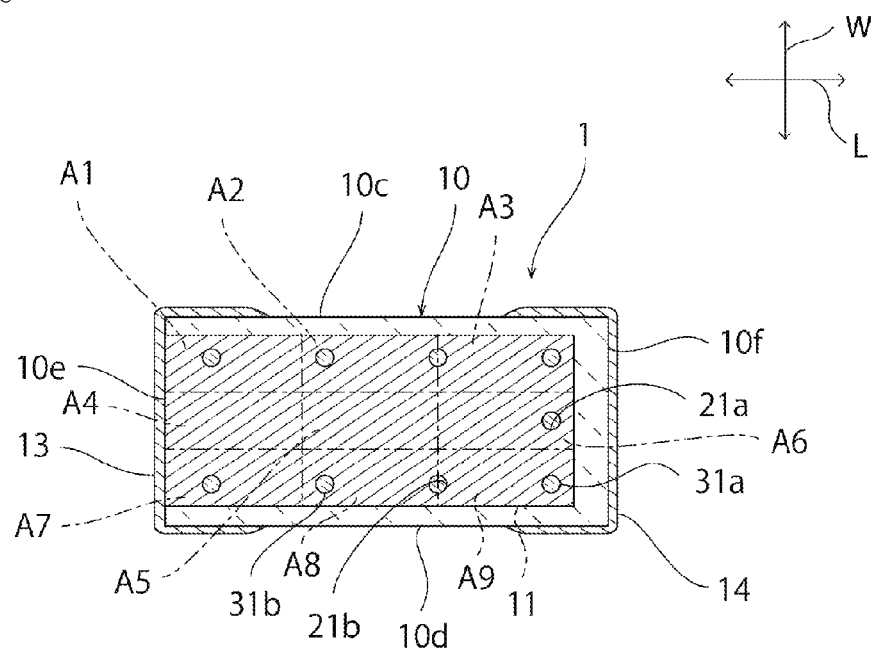
FIG. 3 is a schematic cross-sectional view of a part cut out along the line III-III in FIG. 2.
Figure 4:
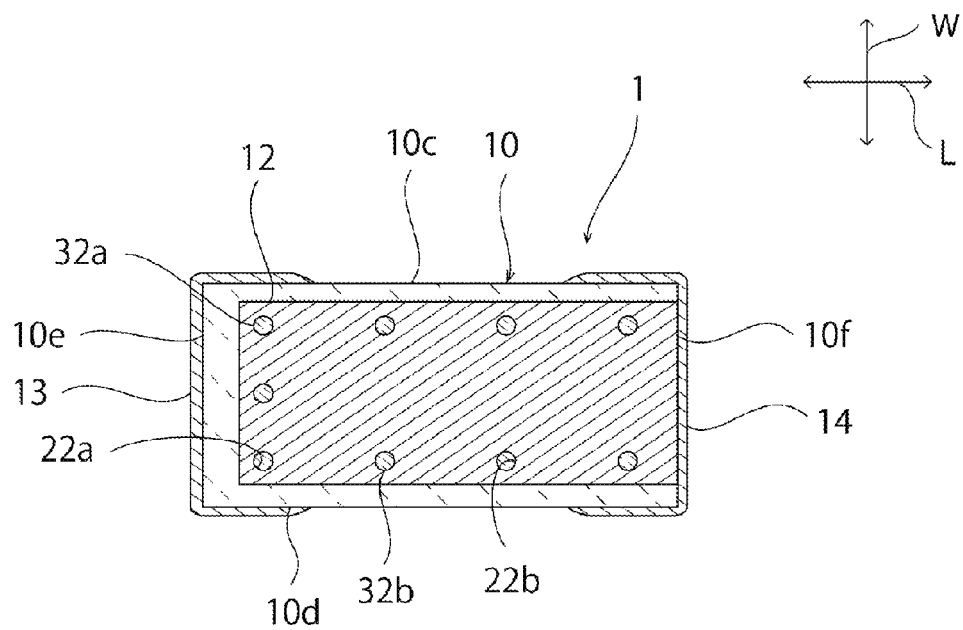
FIG. 4 is a schematic cross-sectional view of a part cut out along the line IV-IV in FIG. 2.

As shown in FIGS. 3 and 4, the internal electrodes 11, have through holes 21a, 21b, 22a, 22b passing through the internal electrodes 11, 12 in the thickness direction. Ceramic columns 31a, 31b, 32a, 32b are disposed in the through holes 21a, 21b, 22a, 22b. These ceramic columns 31a, 31b, 32a, 32b connect the ceramic portions 10g located on one side of the internal electrodes 11, 12 in the thickness direction T and the ceramic portions 10g located on the other side of the electrodes in the thickness direction T. Specifically, the ceramic columns 31a, 31b are located in the first internal electrodes 11 within the electronic component main body 10, and provided at ends that are not exposed from the electronic component main body 10. The ceramic columns 32a, 32b are located in the second internal electrodes 12 within the electronic component main body 10, and provided at ends that are not exposed from the electronic component main body 10. More specifically, more than one ceramic column 31a is provided mutually at intervals in the width direction W at ends of the first internal electrodes 11 closer to the side surface 10f. More than one ceramic column 31b is provided mutually at intervals in the length direction L at ends of the first internal electrodes 11 closer to the side surfaces 10c, 10d. More than one ceramic column 32a is provided mutually at intervals in the width direction W at ends of the second internal electrodes 12 closer to the side surface 10e. More than one ceramic column 32b is provided mutually at intervals in the length direction L at ends of the second internal electrodes 12 closer to the side surfaces 10c, 10d. The ceramic columns are not substantially provided in central portions of the internal electrodes 11, 12.

It is to be noted that in the description of preferred embodiments of the present invention, the ends of the internal electrode mean regions A1 to A4, A6 to A9 located in contact with end sides among nine regions obtained by dividing the internal electrode into three equal portions in each of the length direction and width direction, whereas the central portion of the internal electrode means a region A5 located in the center among the nine regions (see FIG. 3), for example.

Now, delamination of the internal electrodes 11, 12 is likely to be caused from ends of the internal electrodes 11, 12, which are located within the electronic component main body 10. In this regard, in the ceramic electronic component 1, the area ratio of the ceramic columns 31a, 31b, 32a, 32b to the ends of the internal electrodes 11, 12 located within the electronic component main body 10 is greater than the area ratio of ceramic columns to the central portions of the internal electrodes 11, 12. For this reason, the ceramic columns 31a, 31b, 32a, 32b effectively prevent delamination of the internal electrodes 11, from being caused. Furthermore, the prevention of delamination is achieved without increasing the area ratio of ceramic columns to the central portions of the internal electrodes 11, 12, and thus, when the ceramic electronic component is a capacitor, for example, the capacitance is prevented from being decreased.

In particular, the area ratio of the ceramic columns 31a at the ends of the internal electrodes 11 closer to the side surface 10f is preferably greater than the area ratio of ceramic columns in the central portions of the internal electrodes 11. In a firing step in the case of manufacturing the ceramic electronic component 1, the internal electrodes 11 may shrink more than the ceramic portions 10g. In this case, cavities are likely to be generated at tips of the ends of the internal electrodes 11 closer to the side surface 10f. The cavities are likely to serve as starting points for delamination. Delamination of the internal electrodes 11, which is caused with the cavities as starting points, is effectively significantly reduced or prevented by providing the ceramic columns 31a at the ends of the internal electrodes 11 closer to the side surface 10f. From this perspective, the area ratio of the ceramic columns 31a at the ends of the internal electrodes 11 closer to the side surface 10f is preferably greater than the area ratio of the ceramic columns 31b at the ends of the internal electrodes 11 closer to the side surfaces 10c, 10d, and is more preferably twice or more times, further preferably three or more times as high as the area ratio of the ceramic columns 31b at the ends of the internal electrodes 11 closer to the side surfaces 10c, 10d.

Likewise, the area ratio of the ceramic columns 32a at the ends of the internal electrodes 12 closer to the side surface 10e is preferably greater than the area ratio of ceramic columns in the central portions of the internal electrodes 12, and the area ratio of the ceramic columns 32a at the ends of the internal electrodes 12 closer to the side surface 10e is preferably greater than the area ratio of the ceramic columns 32b at the ends of the internal electrodes 12 closer to the side surfaces 10c, 10d, and is more preferably twice or more times, further preferably three or more times as high as the area ratio of the ceramic columns 32b at the ends of the internal electrodes 12 closer to the side surfaces 10c, 10d.

From the perspective of significantly reducing or preventing delamination of the internal electrodes 11 from the ends of the internal electrodes 11 in the width direction W, the area ratio of the ceramic columns 31b at least at one end of the internal electrode 11 in the width direction W is preferably greater than the area ratio of ceramic columns in the central portion of the internal electrode 11.

From the perspective of significantly reducing or preventing delamination of the internal electrodes 12 from the ends of the internal electrodes 12 in the width direction W, the area ratio of the ceramic columns 32b at least at one end of the internal electrode 12 in the width direction W is preferably greater than the area ratio of ceramic columns in the central portion of the internal electrode 12.

Furthermore, from the perspective of significantly reducing or preventing delamination of the internal electrodes 11, more effectively, the cross-section area of the ceramic columns 31a, 31b, 32a, 32b is further preferably about seventy or more times, more preferably about one hundred or more times as large as the square of the thickness of the internal electrodes 11, 12, for example. The cross-section area of the ceramic columns 31a, 31b, 32a, 32b is preferably about 70 μm$^2$ or more, for example. However, the excessively large cross-section area of the ceramic columns 31a, 31b, 32a, 32b may decrease the opposed area of the first internal electrodes 11 and second internal electrodes 12. Therefore, the cross-section area of the ceramic columns 31a, 31b, 32a, 32b is preferably about seven million or less times as large as the square of the thickness of the internal electrodes 11, 12, for example. The cross-section area of the ceramic columns 31a, 31b, 32a, 32b is preferably about 6,200,000 μm$^2$ or less, for example.

From the perspective of further effectively significantly reducing or preventing delamination of the internal electrodes 11, 12, the adhesion strength is preferably high between the ceramic columns 31a, 31b, 32a, 32b and the ceramic parts 10g. Therefore, the ceramic columns 31a, 31b, 32a, 32b and the ceramic portions 10g preferably include the same ceramic material.

In addition, the ceramic columns 31a, 31b provided in one internal electrode 11 of the internal electrodes 11 adjacent to each other in the thickness direction T preferably differ in position mutually from the ceramic columns 31a, 31b provided in the other internal electrode 11. The ceramic columns 32a, 32b provided in one internal electrode 12 of the internal electrodes 12 adjacent to each other in the thickness direction T preferably differ in position mutually from the ceramic columns 32a, 32b provided in the other internal electrode 12. This is because even when asperity due to the ceramic columns is produced in the thickness direction T, the accumulation of asperity is reduced as long as the columns mutually differ in position in a planar direction.

Figure 5:
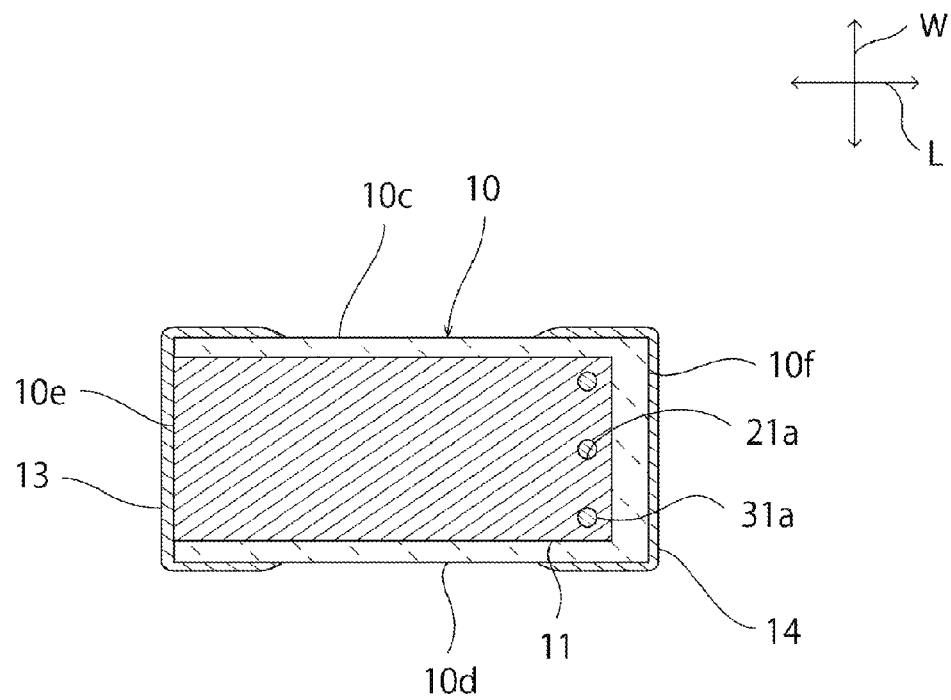
FIG. 5 is a schematic cross-sectional view of a ceramic electronic component according to a first modification example of a preferred embodiment of the present invention.
Figure 6:
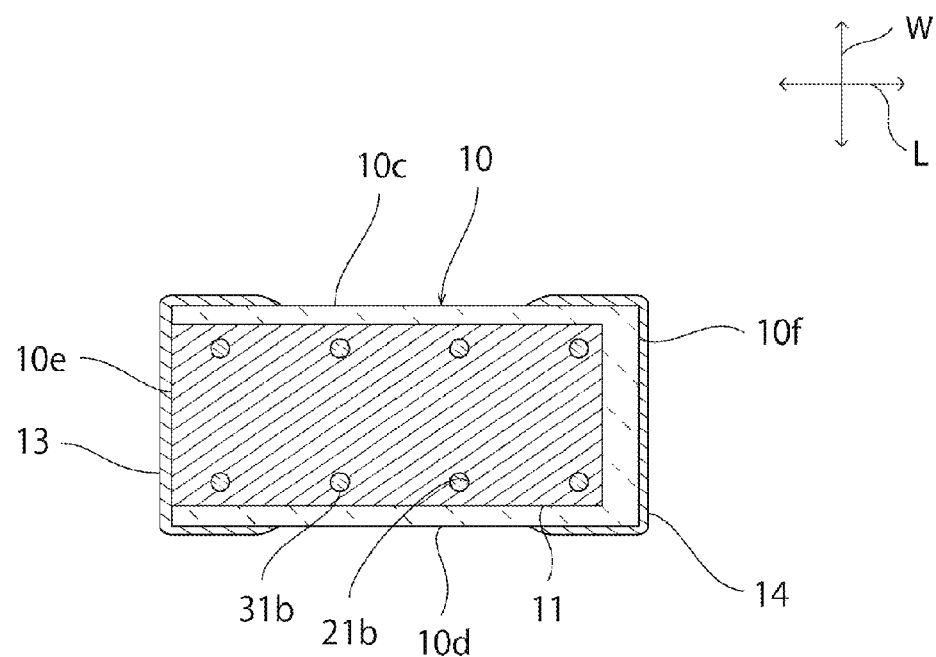
FIG. 6 is a schematic cross-sectional view of a ceramic electronic component according to a second modification example of a preferred embodiment of the present invention.

It is to be noted that an example of providing the ceramic columns 31a, 31b, 32a, 32b at both the ends in the length direction L and the ends in the width direction W, among the ends of the internal electrodes 11, 12 located within the electronic component main body 10, has been described in the present preferred embodiment. However, the present invention is not limited to this configuration. For example, as shown in FIG. 5, ceramic columns 31a, 32a may be provided only at ends in the length direction L, among ends of internal electrodes 11, 12 located within the electronic component main body 10. For example, as shown in FIG. 6, ceramic columns 31b, 32b may be provided only at ends in the width direction W, among ends of internal electrodes 11, 12 located within the electronic component main body 10.

In addition, ceramic columns may be provided at ends of internal electrodes 11 closer to the side surface 10e. The ends of the internal electrodes 11 closer to the side surface 10e may shrink more than ceramic portions. In this case, providing ceramic columns on the side of the ceramic portions closer to the side surface 10e significantly reduces or prevents the shrinkage of the internal electrode, and increases connectivity to external electrodes.

In addition, for example, the ceramic columns 31a, 31b, 32a, 32b may reach the end sides of the internal electrodes 11, 12.

In the present preferred embodiment, an example has been described in which the ceramic columns 31a, 31b, 32a, 32b preferably are columnar in shape. However, the present invention is not limited to this shape. The ceramic columns may be, for example, prismatic.

In the present preferred embodiment, an example has been described in which the internal electrodes preferably are all exposed at the surface of the electronic component main body 10, and connected to the external electrodes. However, the present invention is not limited to this configuration. The ceramic electronic component may include, for example, internal electrodes that are not connected to any external electrode.

Figure 7:
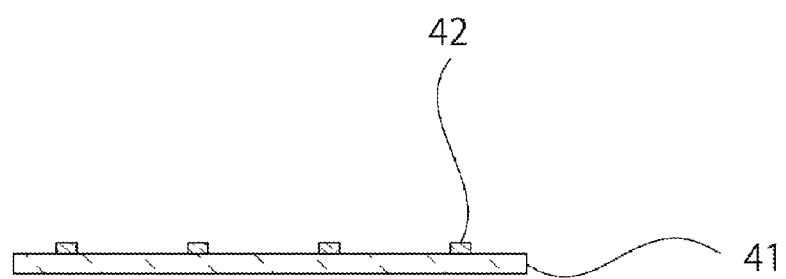
FIG. 7 is a schematic cross-sectional view for explaining a first manufacturing method.

Next, a non-limiting example of a method for manufacturing the ceramic electronic component 1 will be described. First, as shown in FIG. 7, a ceramic green sheet 41 is prepared for constituting the electronic component main body 10. The ceramic green sheet 41 can be formed by various printing methods such as, for example, an ink-jet method or a die coating method.

Next, ceramic columns 42 for constituting ceramic columns 31a, 31b, 32a, 32b are formed on the ceramic green sheet 41. The ceramic columns 42 can be formed, for example, in such a way that a ceramic paste is applied by an ink-jet method or the like, and dried. In the case of adopting an ink-jet method, it is easy to control the positions and cross-section area of the ceramic columns.

Figure 8:
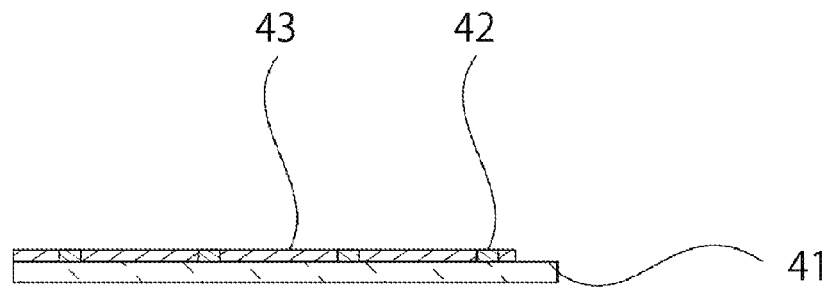
FIG. 8 is a schematic cross-sectional view for explaining the first manufacturing method.

Next, as shown in FIG. 8, a conductive paste layer 43 for constituting internal electrodes 11, 12 is formed over the ceramic green sheet 41, including regions provided with the ceramic columns 42, so as to expose ends of the ceramic columns 42. Next, over the ceramic green sheet 41 with the conductive paste layer 43, etc. printed, ceramic green sheets 41, etc. are further printed appropriately by an ink-jet method or the like to obtain a laminated body. The laminated body can be subjected to firing to complete an electronic component main body 10. Thereafter, external electrodes 13, 14 can be formed by applying a conductive paste onto the electronic component main body 10, and baking the paste.

Figure 9:
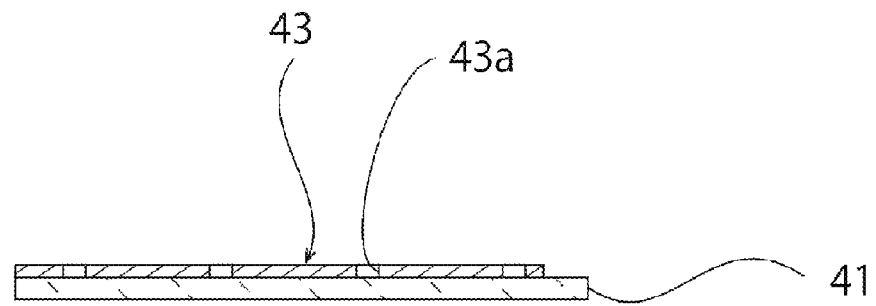
FIG. 9 is a schematic cross-sectional view for explaining a second manufacturing method according to a preferred embodiment of the present invention.

It is to be noted that an example of preferably forming the ceramic columns 42, and then preferably forming the conductive paste layer 43 has been described herein. However, the present invention is not limited to this method. For example, as shown in FIG. 9, after forming a conductive paste layer 43 with through hole 43a, ceramic columns 42 may be formed in the through holes 43a. In this case, the ceramic columns 42 in the through holes 43a and ceramic layers on the conductive paste layer 43 can be formed simultaneously. For this reason, the manufacturing process can be simplified. It is to be noted that it is possible that the conductive paste layer 43 may be incompletely solidified after forming the conductive paste layer 43 with the through holes 43a. Therefore, depending on the size, etc. of the through holes 43a, there is a possibility that the conductive paste layer 43 will fill the through holes 43a in an integrated manner. The through holes 43a filled results in an inability to connect upper and lower ceramic layers with ceramic columns 42. In contrast, when the conductive paste layer 43 is formed after forming the ceramic columns 42 as shown in FIGS. 7 and 8, it is not possible that the through holes 43a will be filled.

As another example, a ceramic green sheet 41 may be partially incorporated into through holes 43a by forming a conductive paste layer 43 with through holes 43a, then further printing the ceramic green sheet 41 by an ink-jet method or the like, and pressing the ceramic green sheet 41 from above.

In addition, the external electrodes 13, 14 may be formed by firing the electronic component main body 10, and then applying and baking a conductive paste. In this case, portions of the internal electrodes 11, 12 to be connected to the external electrodes may fail to be exposed from side surfaces of the electronic component main body 10. The portions of the internal electrodes 11, 12 to be connected to the external electrodes may be exposed by barrel polishing or the like from the side surfaces of the electronic component main body 10.

Alternatively, in the case of forming ceramic sheets 41 by a die coating method, an electronic component main body 10 can be completed by stacking and pressing ceramic green sheets 41 with ceramic columns 42 formed.

In addition, to a predetermined peripheral portion of each ceramic green sheet 41, a conductive paste to serve as an external electrode 13, 14 may be applied in advance by an ink-jet method or the like. In this case, the conductive pastes to serve as external electrodes 13, 14 for each ceramic green sheet 41 are integrated to constitute the external electrodes 13, 14.

Other examples of various preferred embodiments of the present invention will be described below. In the following description, members that have functions in substantially common with the first preferred embodiment described above will be denoted by common reference numerals, and descriptions of the members will be left out.

Second Preferred Embodiment

Figure 10:
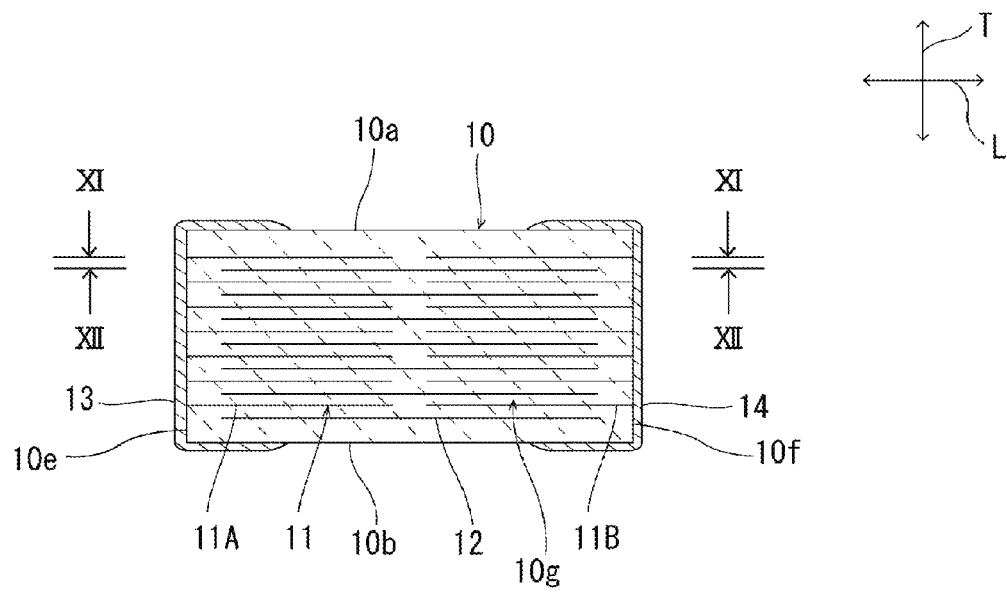
FIG. 10 is a schematic cross-sectional view of a ceramic electronic component according to a second preferred embodiment of the present invention.
Figure 11:
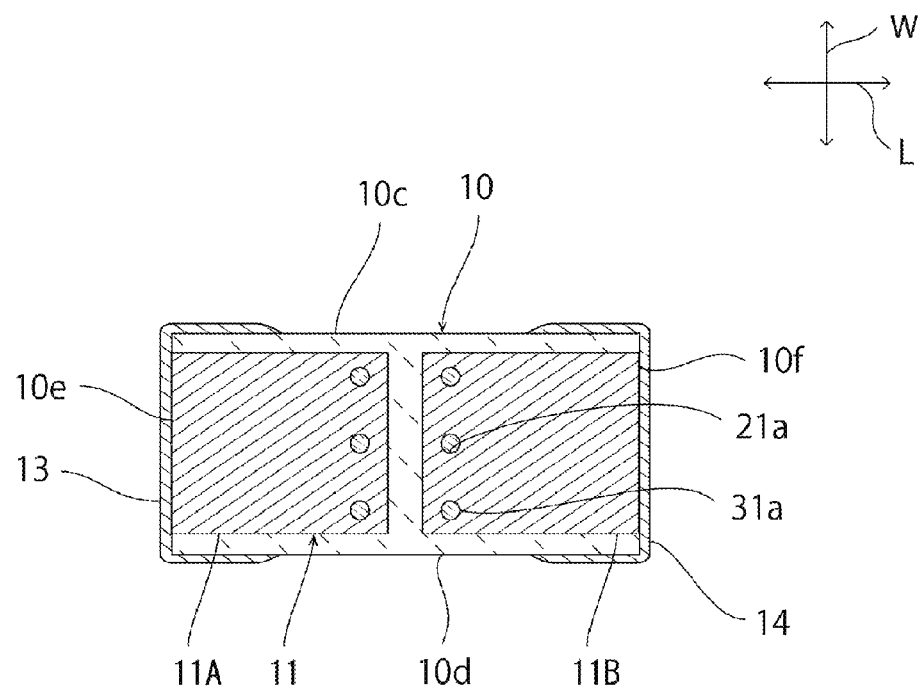
FIG. 11 is a schematic cross-sectional view of a part cut out along the line XI-XI in FIG. 10.
Figure 12:
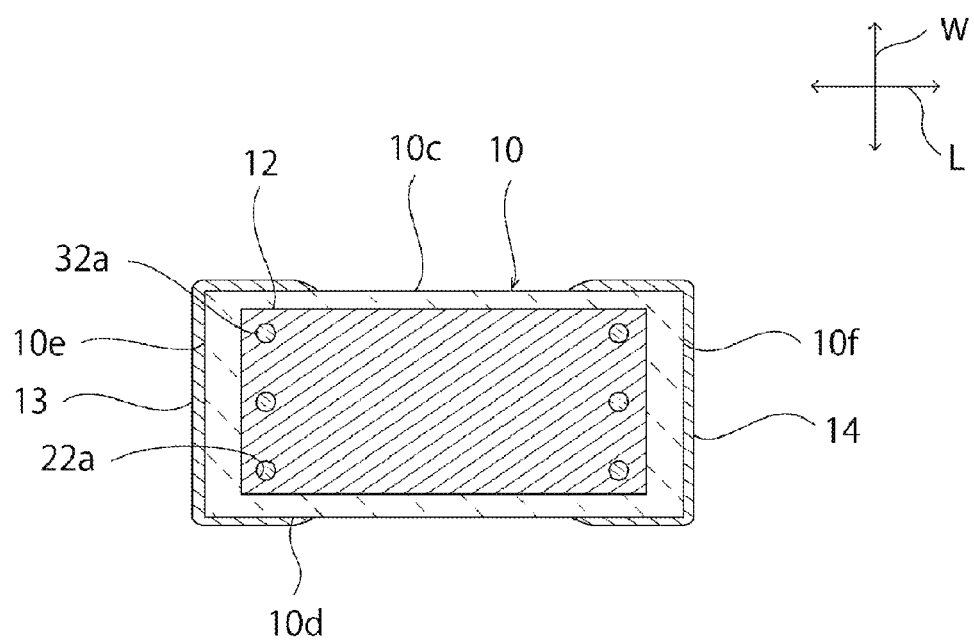
FIG. 12 is a schematic cross-sectional view of a part cut out along the line XII-XII in FIG. 10.

FIG. 10 is a schematic cross-sectional view of a ceramic electronic component according to a second preferred embodiment of the present invention. FIG. 11 is a schematic cross-sectional view of a portion cut out along the line XI-XI in FIG. 10. FIG. 12 is a schematic cross-sectional view of a portion cut out along the line XII-XII in FIG. 10.

With reference to the ceramic electronic component 1 according to the first preferred embodiment, an example has been described in which the first and second internal electrodes 11, 12 preferably are each connected to the external electrode 13 or the external electrode 14. In the present invention, there is not always a need to have internal electrodes connected to an external electrode.

In the ceramic electronic component shown in FIGS. 10 to 12, a plurality of first internal electrodes 11 each includes an electrode portion 11A connected to a first external electrode 13, and an electrode portion 11B connected to a second electrode 14. On the other hand, second internal electrodes 12 are not connected to any of the external electrodes 13, 14. Also in this ceramic electronic component, providing ceramic columns effectively significantly reduces or prevents delamination of the internal electrodes. The internal electrodes 12 preferably are rectangular or substantially rectangular as viewed from the thickness direction T. The area ratio of the ceramic columns to both ends along short sides of the internal electrode 12 is preferably greater than the area ratio of the ceramic columns to both ends along long sides of the internal electrode 12. This is because the length of shrinkage at both ends along the long sides of the internal electrode 12 is larger than the length of shrinkage at both ends along short sides of the internal electrode 12. Providing ceramic columns 32a at both ends along the short sides significantly reduces or prevents delamination of the internal electrodes 11.

It is to be noted that while the dimension of the electrode portion 11A in the length direction L is preferably the same or substantially the same as the dimension of the electrode part 11B in the length direction L in the present preferred embodiment, the dimensions may be different.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   an electronic component main body including a ceramic; and
   an internal electrode disposed in the electronic component main body; wherein
   the internal electrode includes a through hole passing through the internal electrode in a thickness direction thereof;
   the ceramic electronic component further comprises a ceramic column located in the through hole and connecting the ceramic on one side of the internal electrode and the ceramic on the other side thereof;
   an area ratio of the ceramic column to ends of the internal electrode located within the electronic component main body is greater than an area ratio of the ceramic column to a central portion of the internal electrode;
   the electronic component main body includes:
      first and second principal surfaces extending in a first direction, and in a second direction perpendicular or substantially perpendicular to the first direction;
      first and second side surfaces extending in a third direction perpendicular or substantially perpendicular to each of the first and second directions, and in the first direction; and
      third and fourth side surfaces extending in the second direction and in the third direction;
   the internal electrode is exposed at the first side surface, but not exposed at each of the second to fourth side surfaces; and
   an area ratio of the ceramic column to an end of the internal electrode closer to the second side surface in the first direction is greater than the area ratio of the ceramic column to the central portion of the internal electrode.

2. The ceramic electronic component according to claim 1, wherein the area ratio of the ceramic column to the end of the internal electrode closer to the second side surface in the first direction is greater than the area ratio of the ceramic column to at least one end of the internal electrode in the second direction.

3. The ceramic electronic component according to claim 1, wherein a cross-sectional area of the ceramic column is about seventy times or more as large as a square of a thickness of the internal electrode.

4. The ceramic electronic component according to claim 1, wherein a cross-sectional area of the ceramic column is about 70 µm² or more.

5. The ceramic electronic component according to claim 1, wherein the ceramic column includes a same ceramic material as the electronic component main body.

6. The ceramic electronic component according to claim 1, further comprising a plurality of the internal electrodes; wherein
the ceramic column provided in one of adjacent internal electrodes among the plurality of the internal electrodes and the ceramic column provided in the other of the adjacent internal electrodes mutually differ in location.

7. The ceramic electronic component according to claim 1, wherein the ceramic electronic component is one of a capacitor, a piezoelectric component, a thermistor, and an inductor.

8. The ceramic electronic component according to claim 1, wherein the ceramic of the electronic component main body is one of a dielectric ceramic, a piezoelectric ceramic, a semiconductor ceramic, and a magnetic ceramic.

9. The ceramic electronic component according to claim 1, further comprising a plurality of internal electrodes made of one of Ni, Cu, Ag, Pd, Au and an alloy of at least one of Ni, Cu, Ag, Pd and Au.

10. The ceramic electronic component according to claim 1, further comprising a plurality of internal electrodes each including ceramic columns, wherein a cross-sectional area of the ceramic columns is about 7 million times or less larger than a square of thicknesses of the internal electrodes.

11. The ceramic electronic component according to claim 1, further comprising a plurality of internal electrodes each including ceramic columns, wherein a cross-sectional area of the ceramic columns is about 6,200,000 µm².

12. The ceramic electronic component according to claim 1, further comprising a plurality of internal electrodes each including ceramic columns, wherein the ceramic columns in each of the plurality of internal electrodes are located at ends in a length direction and ends in a width direction, the ends in the length direction only, or the ends in the width direction only.

13. The ceramic electronic component according to claim 1, further comprising a plurality of internal electrodes each connected to an external electrode provided on the electronic component main body.

14. The ceramic electronic component according to claim 1, further comprising a plurality of internal electrodes, wherein one of the plurality of internal electrodes is connected to an external electrode provided on the electronic component main body and another of the plurality of internal electrodes is not connected to an external electrode provided on the electronic component main body.

15. A method for manufacturing the ceramic electronic component according to claim 1, the method comprising the steps of:
preparing a ceramic green sheet to form the electronic component main body;
forming, over the ceramic green sheet, a conductive paste layer with the through hole to form the internal electrode; and
filling the through hole with a ceramic paste to form the ceramic column.

16. A method for manufacturing the ceramic electronic component according to claim 1, the method comprising the steps of:
preparing a ceramic green sheet to form the electronic component main body;
forming the ceramic column over the ceramic green sheet; and
forming a conductive paste layer to form the internal electrode over the ceramic green sheet, including regions provided with the ceramic column, such that an end of the ceramic column is exposed.

17. A ceramic electronic component comprising:
an electronic component main body including a ceramic; and
an internal electrode disposed in the electronic component main body; wherein
the internal electrode includes a through hole passing through the internal electrode in a thickness direction thereof;
the ceramic electronic component further comprises a ceramic column located in the through hole and connecting the ceramic on one side of the internal electrode and the ceramic on the other side thereof;
an area ratio of the ceramic column to ends of the internal electrode located within the electronic component main body is greater than an area ratio of the ceramic column to a central portion of the internal electrode;
the electronic component main body includes:
first and second principal surfaces extending in a first direction, and in a second direction perpendicular or substantially perpendicular to the first direction;
first and second side surfaces extending in a third direction perpendicular or substantially perpendicular to each of the first and second directions, and in the first direction; and
third and fourth side surfaces extending in the second direction and in the third direction;
the internal electrode is exposed at the first side surface, but not exposed at each of the second to fourth side surfaces; and
an area ratio of the ceramic column to at least one end of the internal electrode in the second direction is greater than the area ratio of the ceramic column to the central portion of the internal electrode.

18. A ceramic electronic component comprising:
an electronic component main body including a ceramic; and
an internal electrode disposed in the electronic component main body; wherein
the internal electrode includes a through hole passing through the internal electrode in a thickness direction thereof;
the ceramic electronic component further comprises a ceramic column located in the through hole and connecting the ceramic on one side of the internal electrode and the ceramic on the other side thereof;
an area ratio of the ceramic column to ends of the internal electrode located within the electronic component main body is greater than an area ratio of the ceramic column to a central portion of the internal electrode;
the internal electrode is not exposed at any of the first to fourth side surfaces;
the internal electrode is rectangular or substantially rectangular as viewed from the third direction; and
an area ratio of the ceramic columns to both ends along a short side of the internal electrode is greater than an area ratio of the ceramic column to both ends along a long side of the internal electrode.

* * * * *